US005854642A

United States Patent [19]

Takahashi et al.

[11] Patent Number: 5,854,642

[45] Date of Patent: Dec. 29, 1998

[54] INK-JET PRINTED PRODUCTS PRODUCING APPARATUS AND INK-JET PRINTED PRODUCTS PRODUCED BY THE APPARATUS

[75] Inventors: Kazuyoshi Takahashi, Kawasaki; Shoji Koike, Yokohama, both of Japan

[73] Assignee: Canon Kabushiki Kaisha

[21] Appl. No.: 895,265

[22] Filed: Jul. 16, 1997

Related U.S. Application Data

[63] Continuation of Ser. No. 294,827, Aug. 29, 1994, abandoned.

[30] Foreign Application Priority Data

Aug. 31, 1993 [JP] Japan .................................... 5-215835
Aug. 26, 1994 [JP] Japan .................................... 6-202277

[51] Int. Cl.[6] ................................ B41J 2/145; B41J 2/15; B41J 2/01; G01D 11/00

[52] U.S. Cl. ............................. 347/40; 347/105; 347/100

[58] Field of Search ................................. 347/43, 15, 14, 347/105, 100, 16, 6

[56] References Cited

U.S. PATENT DOCUMENTS

| | | | |
|---|---|---|---|
| 4,313,124 | 1/1982 | Hara . | |
| 4,345,262 | 8/1982 | Shirato et al. . | |
| 4,459,600 | 7/1984 | Sato et al. . | |
| 4,463,359 | 7/1984 | Ayata et al. . | |
| 4,558,333 | 12/1985 | Sugitani et al. . | |
| 4,672,432 | 6/1987 | Sakurada et al. . | |
| 4,723,129 | 2/1988 | Endo et al. . | |
| 4,740,796 | 4/1988 | Endo et al. . | |
| 4,969,951 | 11/1990 | Koike et al. | 106/22 |
| 5,250,121 | 10/1993 | Yamamoto et al. | 106/22 R |
| 5,406,392 | 4/1995 | Aoki et al. | 347/43 |

FOREIGN PATENT DOCUMENTS

| | | |
|---|---|---|
| 0388978 | 9/1990 | European Pat. Off. . |
| 0501800 | 9/1992 | European Pat. Off. . |
| 0517468 | 12/1992 | European Pat. Off. . |
| 0558236 | 9/1993 | European Pat. Off. . |
| 62-053492 | 3/1987 | Japan . |
| 62-057750 | 12/1987 | Japan . |
| 63-031594 | 6/1988 | Japan . |
| 3046589 | 7/1991 | Japan . |
| 5330083 | 12/1993 | Japan . |
| 6091998 | 4/1994 | Japan . |

*Primary Examiner*—N. Le
*Assistant Examiner*—Thinh Nguyen
*Attorney, Agent, or Firm*—Fitzpatrick, Cella, Harper & Scinto

[57] ABSTRACT

Ink bottles containing inks having the same tone and different compositions adapted to respective kinds of fibers for a cloth are provided. Printing heads are provided corresponding to respective inks for performing printing.

24 Claims, 11 Drawing Sheets

INK-JET PRINTED PRODUCTS PRODUCING APPARATUS AND INK-JET PRINTED PRODUCTS PRODUCED BY THE APPARATUS

This application is a continuation of application Ser. No. 08/294,827 filed Aug. 29, 1994, now abandoned.

BACKGROUND OF THE INVENTION

1. Field of the Invention

The present invention relates to an ink-jet printing apparatus and a printing method for performing printing by ejecting an ink to a printing medium, such as cloth and so forth, and printed products obtained through ink-jet printing.

Throughout this specification, the wording "print" should be appreciated to include "textile printing". Furthermore, in the specification, "coloring matter is fixed on a printing medium" includes coloring of the printing medium employing the coloring matter in the extent that substantially no washing-out of the color is caused. Also, "tone" means "color" and "density". Accordingly, "same tone" means substantially the same color and the same density.

2. Description of the Related Art

As typical conventional textile printing apparatus for performing printing on cloth, there have been known apparatus employing a roller printing method of forming a sequential pattern on a cloth by depressing a roller on which a pattern is carved onto the cloth, or employing screen printing method preparing plates in a screen form and using the screen plates corresponding to number of colors and patterns to be overlaid so as to perform printing directly on the cloth or so forth.

However, in the textile printing apparatus employing the roller printing method or screen printing method, large number of process steps and days in preparation of the roller or the screen are required. In addition, these textile printing apparatuses require operations for blending of various colors of inks for color matching and positioning of the roller or the screen plates. Furthermore, the apparatus per se is relatively large and becomes larger when to increasing of number of colors to be used, and therefore requires a relatively wide space for installation. Furthermore, an additional space is further required for storing the rollers and screen plates.

On the other hand, as a recording apparatus to be employed in a printer, copy machine, facsimile and so forth, or as a recording apparatus to be employed as an information output apparatus in composite electronic apparatus including computers, word processors and so forth or work stations, an ink-jet type printing apparatus has been put into practical use. In Japanese Patent Application Publication No. 62-57750 and Japanese Patent Application Publication No. 63-31594, there has been proposed to employ such ink-jet type recording apparatus for the textile printing and to perform printing by ejecting ink directly on the cloths.

The ink-jet type recording apparatus performs recording by ejecting ink toward a printing medium from a recording head, and holds many advantages that the recording head can be easily down-sized, a fine image can be recorded at high speed, a cost for running the apparatus is relatively small, running noises of the apparatus are small, and a color image using a plurality of color inks can be easily recorded.

Particularly, a bubble-jet type recording head which ejects ink utilizing thermal energy, can be produced by employing a semiconductor fabricating process, such as etching, deposition, sputtering and so forth. In such case, electro-thermal transducing elements, electrodes and so forth are formed on a substrate, also liquid passage walls and a ceiling plate and so forth are formed on the substrate. Therefore, the recording head permits high density arrangement of liquid passages and ejection orifices, and can be easily down-sized.

However, if the ink-jet printing apparatus is applied for the textile printing by simply replacing the printing medium with cloth, it may be readily expected to cause new technical problems.

For example, the following problems have been known. The cloth as generally referred to includes variety of materials including natural fibers, such as cotton, silk, wool and so forth and synthetic fibers, such as nylon, polyester, acryl and so forth. Naturally, different fibers have different characteristics in textile printing. The characteristics of various fibers have been discussed in detail in "Dyeing", directed by Kazuo Kondo, Denki-Dai Shuppankyoku and "Materials and Products of Apparel", Bunka Fukuso Gakuin, Bunka Shuppankyoku.

Dyeing property of dyes and fibers are in the relationship shown in the following table 1. As can be seen from the table, the dyeing properties of each fiber are differentiated depending upon the dye to be used. When a cloth is woven with a plurality of kinds of fibers having the same or similar dyeing property, one kind of ink (dye), to which a plurality of kinds of fibers have a common dyeing property, can be used. However, in the case where the cloth is woven with a plurality of kinds of fibers having different dyeing properties, such as blended fiber cloth of nylon and cotton, for example, it is desirable to use different inks respectively adapted to respective of the different kinds of fibers. As a construction to use inks respectively corresponding to respective fibers, it can considered to use one kind of ink until the printing amount reaches a predetermined amount with exchanging inks to repeated the printing process. However, in the case of using above-described construction, it is relatively difficult to maintain the accuracy of positioning relationship between a recording head and a cloth, an operation for maintaining the accurate positioning is complicated and thus there is a problem that it is impossible to utilize the advantages of the ink-jet textile printing.

Dyeing property of Dye and Fiber

| Fiber | Dye | | | | | | | | | | |
|---|---|---|---|---|---|---|---|---|---|---|---|
| | Direct | Acid | Metal Complex | Basic (Cation) | Acid Mordant | Vat | Sulphur | Naphthol | Disperse | Reactive | Pigment |
| Cotton, Hemp, Rayon | Δ | | | | | ○ | ○ | ○ | | ○ | ○ |
| Wool, Silk | Δ | ○ | ○ | Δ | ○ | | | | | Δ | Δ |
| Acetate | | Δ | | | | Δ | | Δ | ○ | | Δ |

-continued

Dyeing property of Dye and Fiber

| Fiber | Dye | | | | | | | | | | |
|---|---|---|---|---|---|---|---|---|---|---|---|
| | Direct | Acid | Metal Complex | Basic (Cation) | Acid Mordant | Vat | Sulphur | Naphthol | Disperse | Reactive | Pigment |
| Nylon | Δ | ○ | ○ | Δ | ○ | | | Δ | Δ | Δ | Δ |
| Polyester | | | | | | | | | ○ | | Δ |
| Acryl | | Δ | Δ | ○ | | | | | Δ | | Δ |
| Vinal fiber | Δ | | | Δ | | Δ | Δ | ○ | Δ | | Δ |

○: Good dyeing property
Δ: Dyeing is possible

SUMMARY OF THE INVENTION

It is an object of the present invention to provide an ink-jet printed products producing apparatus which can easily and surely perform high quality printing for cloths woven with a plurality of fibers having mutually different dyeing properties.

According to a first aspect of the present invention, there is provided an ink-jet printed product producing apparatus employing a plurality of ink-jet heads ejecting inks of respectively the same tone and different composition and performing printing by ejecting inks from the plurality of ink-jet heads to a printing medium, the apparatus comprising:

- means for providing the plurality of ink-jet heads for using at different printing steps from each other for printing on the printing medium.

According to a second aspect of the present invention, there is provided an ink-jet printed product producing apparatus employing a plurality of ink-jet heads ejecting inks of respectively the same tone and different composition and performing printing by ejecting inks from the plurality of ink-jet heads to a printing medium containing a plurality of kinds of fibers, the apparatus comprising:

- control means for varying ejection ratio of inks to the printing medium through the ink-jet head depending upon ratio of content of the plurality of fibers.

According to a third aspect of the present invention, there is provided an ink-jet printed product producing apparatus employing a plurality of ink-jet heads ejecting inks of respectively the same tone and different composition and performing printing by ejecting inks from the plurality of ink-jet heads to a printing medium, the apparatus comprising:

- means for determining order of ejection of the plurality of ink-jet heads in printing depending upon a difference of dyes.

According to a fourth aspect of the present invention, there is provided an ink-jet printed product producing apparatus employing a plurality of ink-jet heads ejecting inks of respectively the same tone and different composition and performing printing by ejecting inks from the plurality of ink-jet heads to a printing medium, the apparatus comprising:

- print control means for making inks ejected from the plurality of ink-jet heads to shoot onto substantially the same position on the printing medium.

According to a fifth aspect of the present invention, there is provided an ink-jet printed product producing apparatus employing a plurality of ink-jet heads ejecting inks of respectively the same tone and different composition and performing printing by ejecting inks from the plurality of ink-jet heads to a printing medium, the apparatus comprising:

- feeding means for feeding the printing medium;
- scanning means for arranging the plurality of ink-jet heads in the feeding direction of the printing medium fed by the feeding means and for operating the plurality of ink-jet heads for scanning in a direction different from the feeding direction; and
- control means for controlling feeding of the feeding means and scanning by the scanning means and thus overlaying printing region by respective ones of the plurality of ink-jet heads.

According to a sixth aspect of the present invention, there is provided a producing method of an ink-jet printed product of performing printing by ejecting ink onto a printing medium, the method comprising the steps of:

- providing a plurality of ink-jet heads respectively ejecting inks of the same tone and different composition; and
- performing printing steps employing respective ones of the plurality of ink-jet heads with a given interval between the printing steps.

The above and other objects, effects, features and advantages of the present invention will become more apparent from the following description of embodiments thereof taken in conjunction with the accompanying drawings.

BRIEF DESCRIPTION OF THE DRAWING

The present invention will be understood more fully from the detailed description given herebelow and from the accompanying drawings of the preferred embodiment of the present invention, which, however, should not be taken to be limitative to the invention, but are for explanation and understanding only.

In the drawings.

DESCRIPTION OF THE PREFERRED EMBODIMENTS

The present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instances, well-known structures are not shown in detail in order to unnecessarily obscure the present invention.

It should be noted that while the following detailed description is directed to an application of the present invention to an ink-jet printing apparatus serving as a textile printing apparatus, the ink-jet printing apparatus according to the present invention is, of course, applicable for various other applications, such as printing apparatus and so forth.

(First Embodiment)

Figure 1:
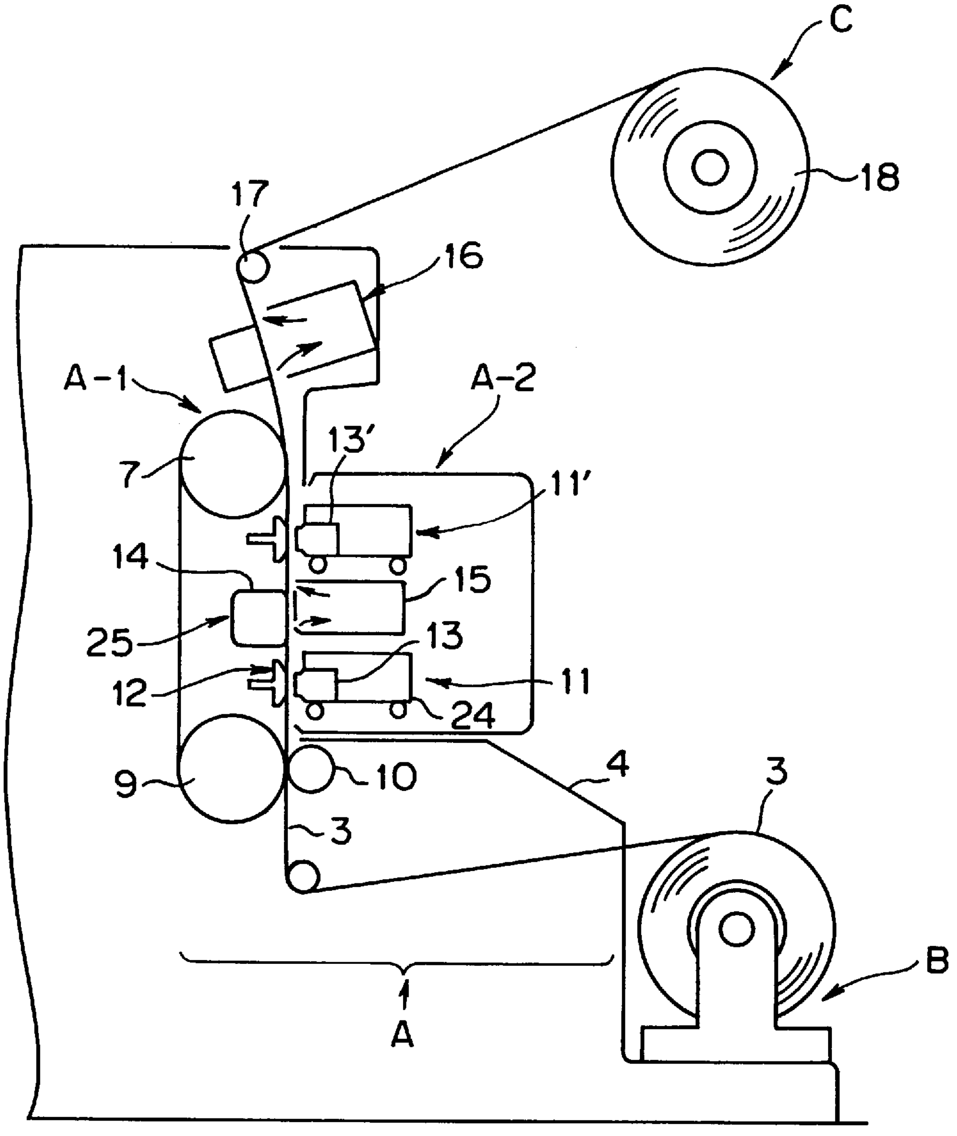
FIG. 1 is a sectional side elevation showing a mechanical construction of a printer for which the present invention is applicable.
Figure 2:
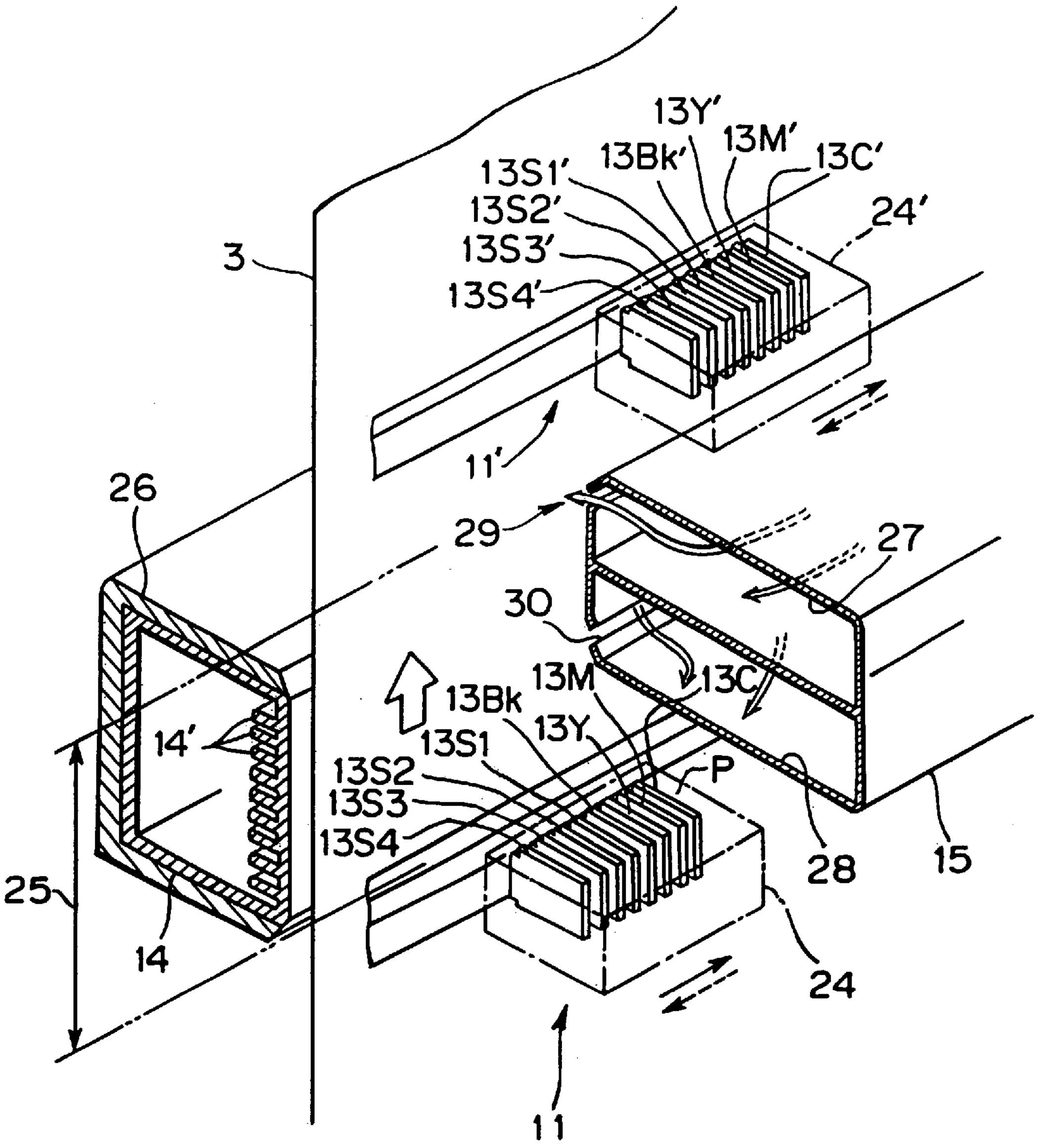
FIG. 2 is a perspective view showing one example of a construction around a printing head of the printer of FIG. 1.

FIG. 1 shows an example of an ink-jet printing apparatus as the first embodiment of a textile printing apparatus according to the present invention, and FIG. 2 is an enlarged perspective view showing the major part of the ink-jet printing apparatus of FIG. 1. The shown embodiment of the textile printing apparatus generally comprises a cloth feeding portion B for feeding a cloth on a roll, which is processed for preparation for textile printing, a main body portion A performing printing with an ink ejected from an ink-jet head with precise line-feeding for the fed cloth, and a winding portion C drying and winding the printed cloth. The main body portion A comprises a precise line feeding portion A-1 including a platen and a printing unit A-2.

A processed cloth 3 in a form of roll is supplied to the cloth 3 feeding portion B. Then, the cloth is fed to the main body portion A in stepping manner.

The cloth 3 fed in stepping manner is restricted to flatten a printing surface by a platen 12 in a first printing portion 11. To this printing surface, ink is ejected from the ink-jet head 13 on scanning in perpendicular direction with respect to the plane of the drawing, for performing printing for one line. After completion of printing for one line, the cloth is set for a predetermined stepping amount (line-feeding amount). The printed portion of the cloth is subsequently heated from the back side thereof by a heating plate 14 and dried by hot air supplied from the surface side thereof and ventilated, by a hot air duct 15. Subsequently, in a second printing portion 11', overlaying printing is performed for the portion printed by the first printing portion 11 in the same process to the first printing portion.

In the construction set forth above, when printing is to be performed for a blended fiber cloth of cotton and polyester, for example, inks to be ejected from the head 13' arranged at the upper portion in FIG. 1 and from the head 13 arranged at the lower portion have the same tone but mutually different compositions. Namely, the head 13' ejects the ink containing reactive dye having good dyeing property to cotton, and the head 13 ejects the ink containing disperse dye having good dyeing property to polyester. In addition, in the overlaying printing by using the ink-jet heads 13 and 13', each ink droplet ejected from the heads 13 and 13' for printing a same pixel is shot onto substantially the same point on the cloth 3.

As set forth above, by performing printing with inks having good dyeing property to correspond to respective fibers forming the cloth, sufficient dyeing can be performed for respective fiber resulting in high quality printing.

The cloth completed printing in the first and second printing portions 11 and 11' is again dried by post drying portion 16 similar to the heating plate 14 and the duct 15 set forth above, guided by a guide roller 17 and then wound on a winding roll 18. The cloth thus wound on the winding roll is removed from the shown apparatus. Then, the cloth is subject color development, washing and drying processes by batch process to become the product.

In FIG. 2, the cloth 3 as the printing medium is fed in stepping manner upwardly in the drawing. In the first printing portion 11 at the lower side in the drawing, a first carriage 24 mounting ink-jet heads for ejecting ink of the colors yellow (Y), magenta(M), cyan (C), black (BK) and special colors S1 to S4, namely eight ink-jet heads 13Y, 13M, 13C, 13BK, 13S1 to 13S4, and movable in the direction shown by arrow, is provided. The ink-jet head in the shown embodiment has element for generating thermal energy for causing film boiling in ink as energy to be utilized for ejecting ink. A plurality of elements are arranged corresponding to 256 ejection orifices arranged at a density of 400 DPI.

At the downstream side (upper side in the drawing) in the cloth feeding direction, of the first printing portion, a drying portion 25 is provided. The drying portion 25 includes the heating plate 14 for drying the cloth 3 from the backside thereof and the hot air duct 15 for drying the cloth from the surface side. The heat transmission surface of the heating plate 14 strongly heats the cloth from the back side with high temperature and high pressure vapor passing through hollow interior thereof. A plurality of fins 14' are provided on the inner side of the heating plate 14 for collecting heat so that the heat may be efficiently concentrated on the back side of the cloth 3. The heating plate 14 is covered with a heat insulating material 26 at the opposite side to the side mating with the cloth 3 so as to avoid loss of heat by radiation.

At the surface side of the cloth 3, as a dry hot air is blown thereonto by the hot air supply duct 27 so as to enhance effect of drying by blowing air at lower temperature than the heat provided by the heat plate, drying of the cloth is promoted. Also, air containing sufficient moisture and flowing in the opposite direction to the cloth feeding direction, is drawn in a much greater amount than blowing amount by the upstream side drawing duct 28 so that evaporated water vapor may not cause leakage to cause dew drops on the peripheral machine devices. A supply source of the hot air is placed at the back side in FIG. 2, and, on the other hand, drawing of the hot air is performed from the front side, so that the pressure difference between the pressures at a blowing opening 29 and a drawing opening 30 can be uniform at overall area in the longitudinal direction. The air blowing and drawing portion is offset to the downstream side with respect to the center of the heating plate 14 at the back side of the cloth so that the air may be blown onto the portion sufficiently heated. By this, a large amount of water including a reducer contained in ink received in the cloth can be strongly dried.

Furthermore, at the downstream side, there is provided the second printing portion 11' which is formed with eight ink-jet heads 13Y', 13M', 13C', 13BK' and 13S1' to 13S4' and a second carriage 24' mounting these ink-jet heads, similarly to the first carriage. It should be appreciated that the first carriage 24 and the second carriage 24' may be preliminarily integrated or integrated with an appropriate coupling member so as to make the driving power source and power transmission mechanism in common to each other.

Also, though it is not illustrated in FIGS. 1 and 2, an ink supply device for storing ink and supplying necessary amount of ink to the head is provided. The ink supply device includes an ink tank, an ink pump and so forth as known in the art. A main body of the ink supply device is connected to the head through an ink supply tube and so forth. Typically, by capillary effect, an amount of ink corresponding to the amount ejected through the head is automatically supplied to the head. On the other hand, in an ejection recovery operation, ink is forcedly supplied to the head by means of the ink pump. The head and the ink supply device are mounted on different carriages for reciprocation in the direction shown by the arrow by a not shown driving device.

Also, while it is not illustrated in FIGS. 1 and 2, it is possible to provide a head recovery device at a position to mate with the head at a home position (retracted position) for maintaining ejection stability of ink by the head. The head recovery device may perform the following operation. Namely, in order to avoid vaporization of ink from the ejection orifice of the head in inoperative state, capping for the head is performed at the home position. Also, a collection operation is performed when in order to remove bubble and/or dust at the ejection orifice before initiation of image recording, ink path in the head is pressurized by means of the ink pump for forcedly discharging ink through the ejection orifice (pressurizing recovery operation), or ink is forcedly drawn from the ejection orifice to discharge by a negative pressure (suction recovery operation).

Figure 3:
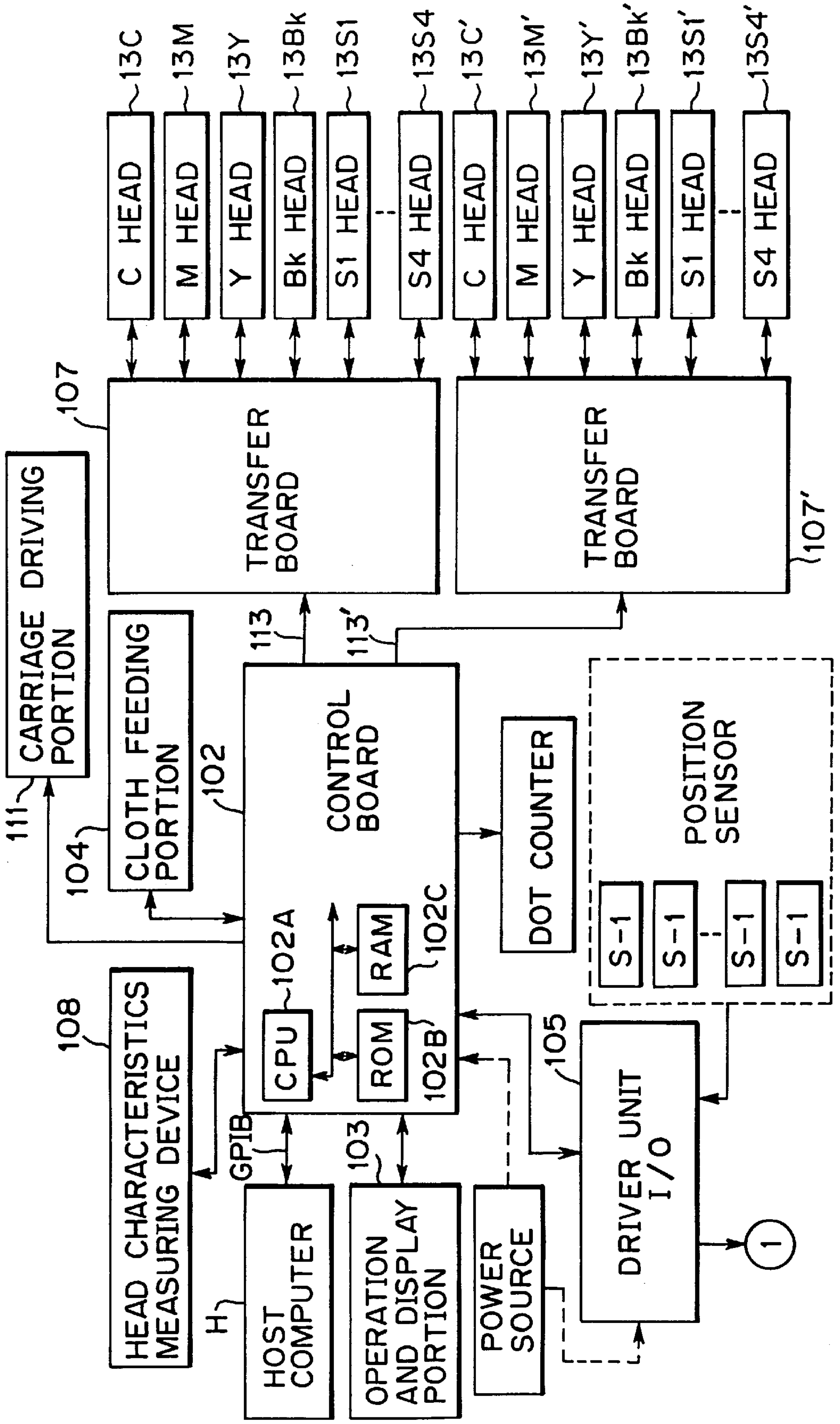
FIG. 3 is a schematic block diagram showing electrical construction of the printer of FIG. 1.
Figure 4:
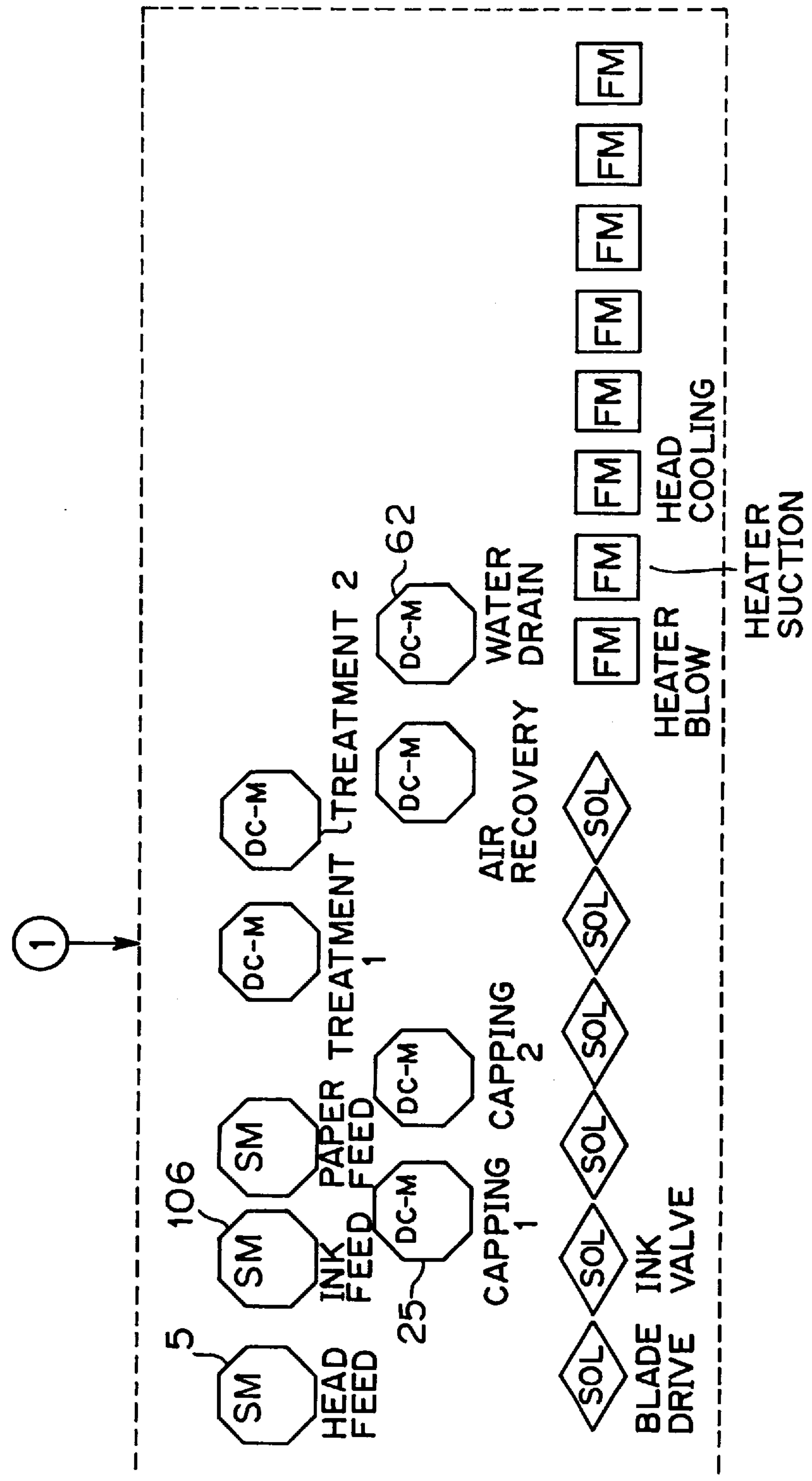
FIG. 4 is a similar block diagram to that of FIG. 3.
Figure 5:
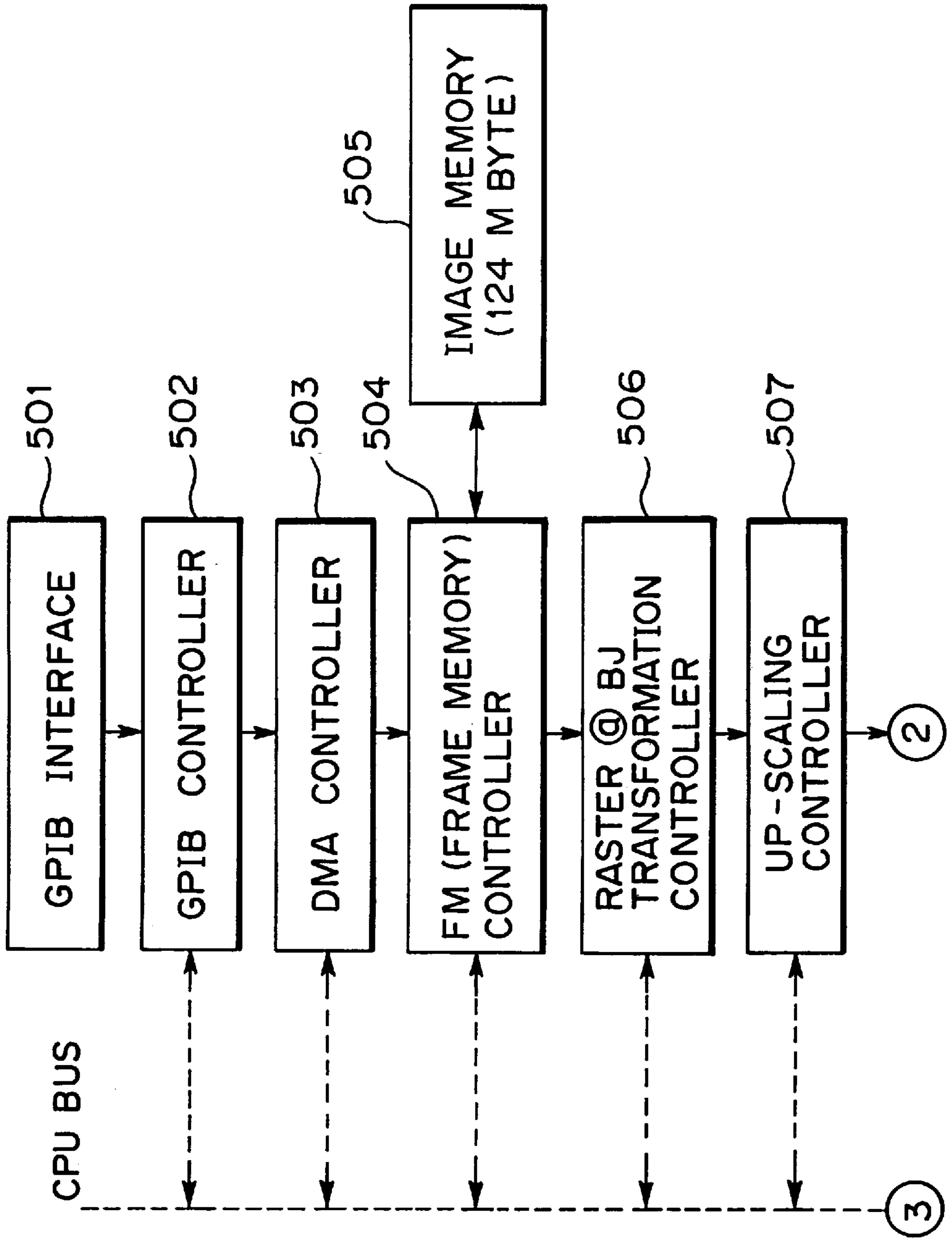
FIG. 5 is a block diagram illustrating an internal construction of a control board in FIG. 3 in view of flow of data.

Description will be given for a control system of the shown embodiment of the apparatus. FIGS. 3 and 4 show an example of a control system for the shown embodiment of the textile printing apparatus and its operating portion. FIGS. 5 to 7 conceptually illustrate internal construction of a control board 102 of FIG. 3 in terms of flow of data.

From a host computer H, a printing image data is transmitted to a control board 102 via an interface (here, GPIB). In addition to this, a color pallet data and so forth determining mixing ratios of Y, M, C or special colors for precisely reproducing colors selected by a designer, is transmitted to the control board 102. For the construction of this, the system disclosed in commonly assigned Japanese Patent Application Laying-open No. 6-91998 may be employed.

The device for transmitting the image data is not specified. Also, transmission of the image data may be performed in various manners such as on-line transmission through a network, off-line transmission via a magnetic tape or other data recording medium, or so forth. A control board 102 comprises CPU 102A, ROM 102B storing various programs, RAM 102C having various register regions and working regions and other portions illustrated in FIGS. 5 to 7 and performs control for overall apparatus. The reference numeral 103 denotes an operation and display portion including an operating portion for providing necessary command for the textile printing apparatus by an operator, and a display portion for displaying messages and so forth to the operator. A reference numeral 104 denotes a cloth feeder comprising a motor and so forth for feeding the printing medium, such as cloth, fabric or so forth as an object to be printed. A reference numeral 105 denotes a driver unit input/output portion for driving various motors (labeled with "M" at the end) and various solenoids (labeled as "SOL") shown in FIG. 4. A reference numeral 107 denotes a transfer board receiving information associated with respective head (information of presence or absence of the head and/or color to be printed by the head) and supplying this information to the control board 102. The information from the transfer board 107 is transferred to the host computer H and to demand transfer of the color pallet of the color to be used. Also, the information is used for recognition of a mounting range of the heads to the carriage 24 and 24' and for setting scanning range and so forth. Reference numeral 111 denotes a driving portion, such as motor, for driving the carriages 24 and 24' for scanning.

When the image data to be printed is received from the host computer H, the control board 102 accumulates the image data in an image memory 505 via a GPIB interface 501 and a frame memory controller 504 (see FIG. 5). In the shown embodiment, the image memory 505 has 124 Mbyte of capacity for storing 8-bit pallet data for A1 size image data. Namely, 8 bits are assigned for each pixel. A reference numeral 503 denotes a DMA controller for high speed memory transfer. When image data transfer from the host computer H is completed, the control board 102 performs predetermined process and then initiates printing.

Here, the host computer H connected to the shown embodiment of the textile printing apparatus transfers the image data as raster image data. On the other hand, for a plurality of ink ejection orifices arranged in longitudinal direction of the head, data in the direction perpendicular to the arranging direction of the raster image data is assigned, respectively. Therefore, the arrangement of the image data has to be transformed into that consistent with the arrangement of the printing heads. This data transformation is performed by a raster-@-BJ transformation controller 506. The data transformed by the raster-@-BJ transformation controller 506 is transferred to a pallet conversion controller 508 via an up-scaling function of a next stage up-scaling controller 507 for varying the scale of the image data. It should be appreciated that the data up to the up-scaling controller 507 is the identical data to the data transmitted from the host computer, and thus to the 8-bit pallet signal in the shown embodiment. The pallet data (8 bits) is commonly transferred to processing portions (discussed later) for respective printing heads.

The following description will be given in terms of the embodiment including heads or printing yellow, magenta, cyan, black and other special colors S1 to S4.

Figure 6A:
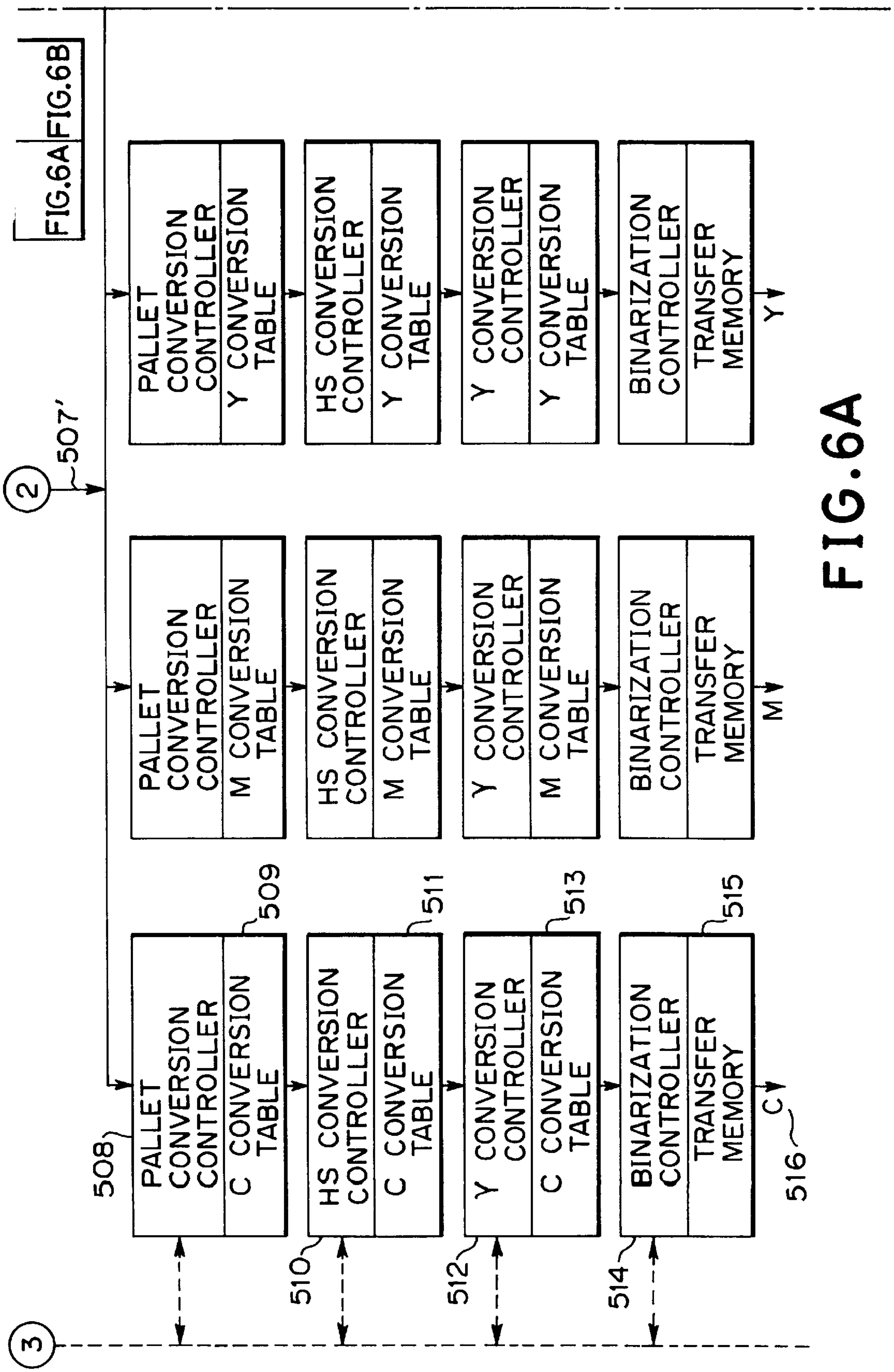
FIGS. 6A and 6B are similar block diagrams to that of FIG. 5.
Figure 6B:
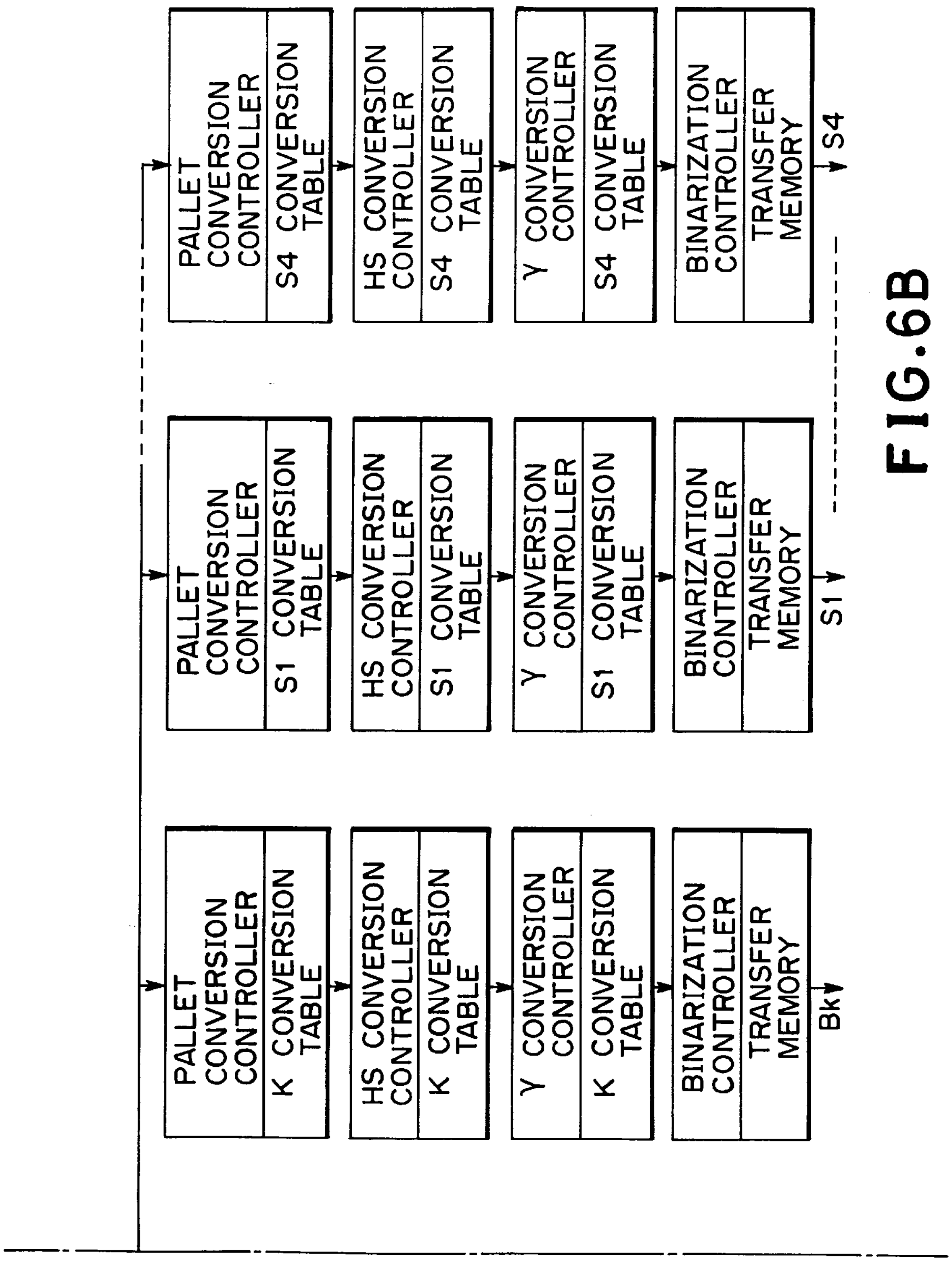
Figure 7:
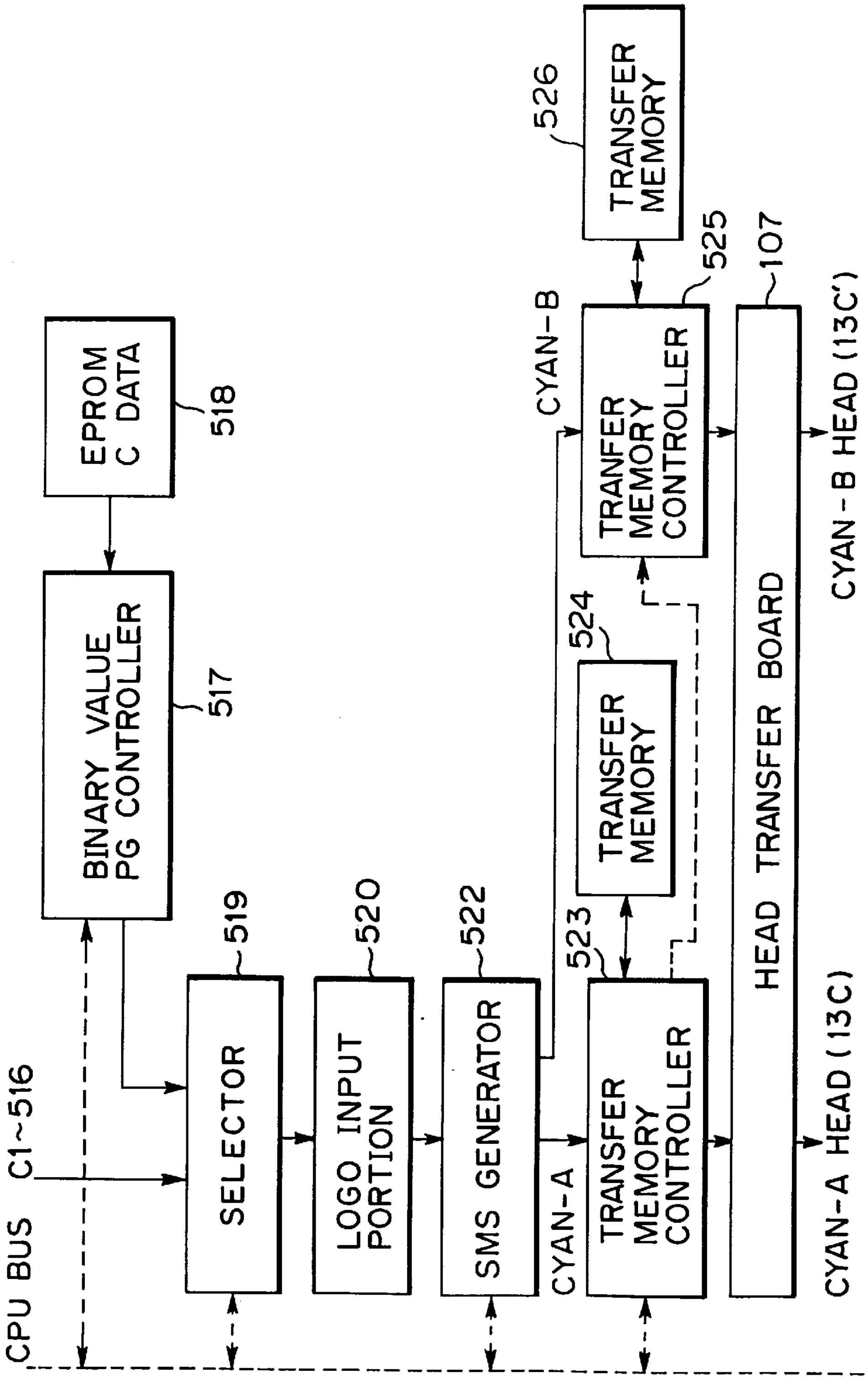
FIG. 7 is a similar block diagram to that of FIG. 5.

In FIGS. 6A and 6B, the pallet conversion controller 508 supplies the pallet data input from the host computer H and a conversion table for the corresponding color to a conversion table memory 509.

In case of 8-bit pallet data, colors to be reproduced are 256 kinds of 0 to 255. Appropriate tables are developed in the table memory 509 corresponding to respective colors. For example, the following relationship is set in a table:

| | |
|---|---|
| when 0 is input | light gray is printed |
| when 1 is input | special color 1 is printed |
| when 2 is input | special color 2 is printed |
| when 3 is input | blue type color as blended color of cyan and magenta is printed |
| when 3 is input | cyan is printed |
| when 5 is input | red type color as blended color of magenta and yellow is printed |
| . | . |
| . | . |
| . | . |
| when 254 is input | yellow is printed |
| when 255 is input | not print |

As a concrete circuit construction, the pallet conversion table 509 performs function by writing conversion data at address corresponding to the pallet data. Namely, in practice, when the pallet data is supplied as address, memory access is performed in read mode. The pallet conversion controller

508 performs management of the pallet conversion table memory 509 and interfacing between the control board 102 and the pallet conversion table memory 509. Also, concerning the special colors, a circuit for setting a blending amount of the special color (a circuit for multiplying an output for 0 to 1 times) may be disposed between HS system comprising the next stage HS controller 510 and HS conversion table memory 511 to make the set value variable.

The HS controller 510 and the HS conversion table memory 511 perform correction of fluctuation of printing density corresponding to each ejection orifice of each head on the basis of a data measured by a head characteristics measuring device 108 (see FIG. 3) including a correcting portion for correcting unevenness of density. For instance, the process for the ejection orifice having the characteristics to have small ejecting or expelling amount, and thus to have low printing density, the data is converted into high density data, for the ejection orifice having the characteristics to have large ejecting amount, the data is converted into lower density data, and for the ejecting orifice having the characteristics to have medium ejecting amount, the data is maintained without conversion, is performed. This process will be discussed later.

A γ conversion controller 512 and a γ conversion table memory 513 in the next stage, performs table conversion for increasing and decreasing overall density per each color, For example, if no conversion is effected, the table becomes linear as follows:

| | |
|---|---|
| for input 0 | output 0 |
| for input 100 | output 100 |
| for input 210 | output 210 |
| for input 255 | output 255 |

A binarization controller 514 has a pseudo-tone function to input 8-bit tone data and output binarized one-bit pseudo tone data. As a method for converting many-valued data into binary data, there are methods employing dither matrix, an error dispersing method and so forth. The shown embodiment may employ any one of such methods, and detailed description therefor is omitted. Nevertheless, any method which may express the tone with number of dots in the unit area may be utilized.

The binarized data is once stored in a transfer memory 515 and then used for driving each color of ink-jet head. Namely, the binary data is output from respective transfer memory for each ink of C, M, Y, BK, S1 to S4. Since the binary signal for each color is processed in the same manner, the following description will be given with respect to the binary data of cyan (C) with reference to FIG. 7. FIG. 7 shows the construction for cyan of the printing color. The same construction is employed for each color. Also, FIG. 7 shows a circuit construction subsequent to the transfer memory 515.

The binarized signal C is output toward a sequential multi-scan generator 522 (hereinafter referred to as SMS generator). However, since test printing on the basis of predetermined pattern data from binary value PG controller forming a pattern generator 517 and EPROM 518, the pattern data and the binarized signal C are supplied to a selector 519 for selecting one of the pattern data and the signal C. Switching of selection in the selector 519 is controlled by CPU of the control board 102, when the operator performs predetermined operation in the operating portion 103 (see FIG. 3), the data from the binary value PG controller 517 is selected to perform test printing. Therefore, the selector 519 usually selects the data from the transfer memory 515. A reference numeral 520 denotes a logo input portion disposed between the selector 519 and the SMS generator 522. In the logo input portion 520, in case of the textile printing, logo mark data for maker's brand or designer's brand and so forth is input. The construction of the logo input portion may include a memory for storing the logo mark data and a controller for managing the printing position of the logo mark, and so forth.

The SMS generator 522 is adapted to perform a process for preventing fluctuation of density in the image due to difference of the ejecting or expelling amount in respective ejection orifices. Sequential multi-scanning concerning this process has been proposed in Japanese Patent Application Laying-open No. 5-330083. In the disclosed system, density fluctuation is reduced by expelling ink through a plurality of ejection orifices for one pixel and whereby the quality of the printed image is improved. In the SMS generator 522, whether multi-scanning is performed or not for providing preference to high printing speed, can be instructed through an appropriate input means, such as the operating and display portion 103 or the host computer H.

The transfer memory 524 is a buffer memory for correcting physical position of the ink-jet heads, namely the position between the upper and lower printing portion shown in FIG. 2 or position between each heads. The image data is temporarily input to the transfer memory 524 and output at a timing corresponding to the physical position of the heads. Accordingly, the transfer members 524 are differentiated in capacity for respective colors.

After performing the data processing set forth above, the data is transferred to the ink-jet heads 13C and 13C' for cyan C via a heat transfer board 107.

Figure 8:
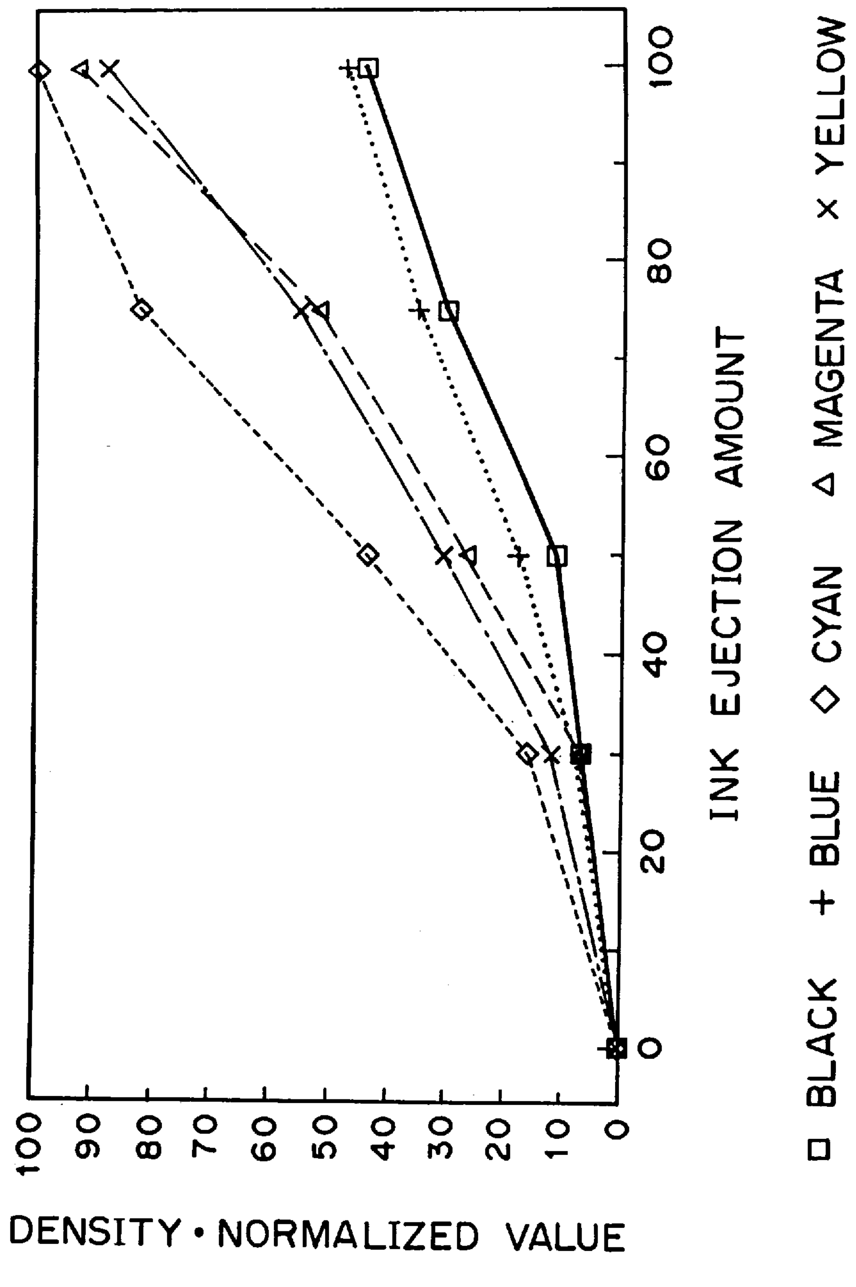
FIG. 8 is an explanatory illustration for explanation of density in printing of each color.

FIG. 8 shows a relationship between ejecting amount of ink to the cloth and dyeing density. In FIG. 8, the axis of abscissa represents the ink ejection amount indicated as a ratio taking the maximum ejection amount in the unit area as 100. The axis of ordinate represent a function K/S (K: absorption coefficient, S: scattering coefficient) of reflectivity R of the dyed article after finishing color development and washing process subsequent of printing on the cloth, which is expressed by:

$$K/S=(1-R)^2/2R$$

The value of K/S is the value quantizing the visual dyeing density.

In FIG. 8, the density is illustrated as normalized value of K/S value with taking the maximum K/S value of cyan as 100, in which greater value represents higher density. In FIG. 8, there are also illustrated the characteristics of yellow, magenta, cyan, black as standard color and blue as special color.

As can be clear from FIG. 8, in comparison with yellow, magenta and cyan, black and blue as the special color may obtain approximately half density.

Figure 9:
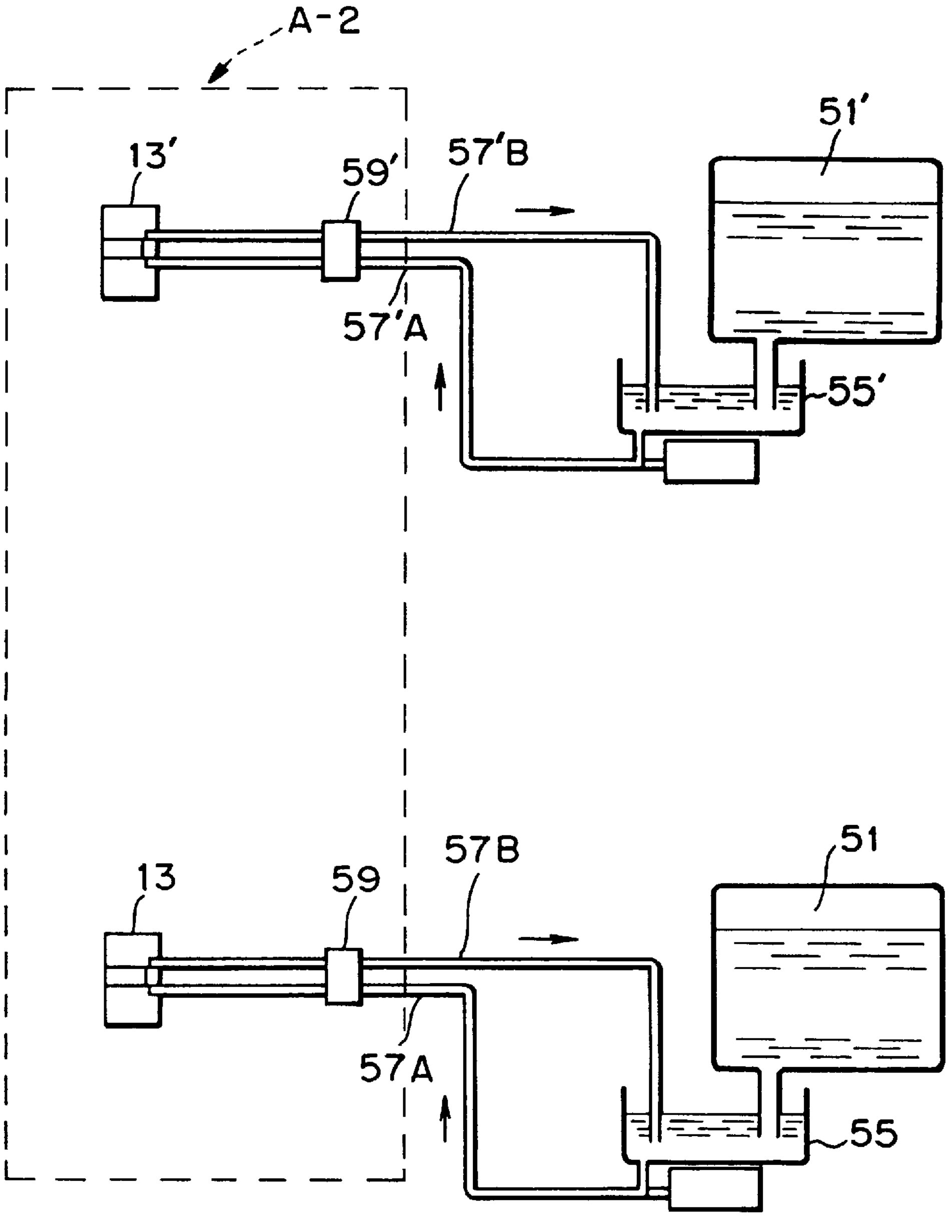
FIG. 9 is a diagrammatic illustration for explanation of ink supplying system in the shown embodiment.

FIG. 9 is a diagrammatic illustration showing an example of construction of ink supply system in the shown embodiment of the textile printing apparatus. Here, reference numerals 51 and 51' denote ink bottles forming ink supply source for the lower stage ink-jet head 13 and the upper stage ink-jet head 13', respectively. These ink bottles 51 and 51' may be in a form of cartridge detachable to the shown embodiment of the apparatus. Reference numerals 55 and 55' denote sub-tanks as intermediate ink storage members arranged in respective ink supply passages between the ink bottle 51 and the lower head 13 and between the ink bottle 51' and the upper head 13', which store ink supplied from the ink bottles 51 and 51' and also stores ink recirculated from the heads 13 and 13', respectively. The liquid levels in these sub-tanks 55, 55' may be maintained constant by appropriate liquid level sensors, not shown valves disposed in the ink supply passages and driving means thereof, or by constructing the sub-tank as enclosed system, and thereby maintain the supply pressure of the ink for the heads 13 and 13' constant.

Reference numerals 57A and 57'A denote ink tubes forming an ink supply passage from the sub-tank 55 to the lower head 13 and an ink supply passage from the sub-tank 55' to the upper head 13', respectively. Parts of the ink tubes 57A and 57'A are formed with flexible members connected to ink connectors 59 and 59' provided on the carriages 24 and 24' (see FIG. 2) to follow the scanning motion of the latter. Reference numerals 57B and 57'B denote ink tubes similar to the ink tubes 57A and 57'A and forming ink recirculation passages to the sub-tanks 55 and 55'. Reference numerals 60 and 60' denote pressurizing motors for pressurizing ink supply system via the tubes 57A and 57'A for forcedly discharging ink through the heads 13 and 13' during recovery operation set forth above, respectively.

As shown in FIG. 9, in the shown embodiment, completely independent ink supply systems are arranged for upper stage head array and lower stage head array, and such two ink supply systems are arranged for respective heads. As set forth above, respective ink supply systems supply inks of mutually different composition for each color corresponding to two kinds of fibers of the blended fiber cloth having mutually different dyeing properties.

Here, a preferred blended fiber cloth or fabric which can enhance the effect of the present invention as applied for the shown embodiment of the textile printing apparatus may have fiber blending ratio in the following range. Namely, in case of blended fiber cloth of two kinds of fibers, the preferred blending ratio by weight is in a range of 10:1 to 1:10, more preferably in a range of 3:1 to 1:3. In case the blending ratio is out of the above-mentioned range, necessity for using different composition of ink for the same color becomes low and can attain sufficient coloring even when one kind of ink adapted to the fiber having greater proportion of blending. In such case, while overall ink amount ejected to the cloth becomes smaller since the ink corresponding to the fiber of smaller proportion is not used, influence of not ejecting the ink will not be perceptible in the finally obtained printed article for small proportion of the corresponding fiber.

On the other hand, in case of blended fiber cloth of three kinds of fibers or more, ink having composition adapted to the fiber should be used for the fiber having proportion greater than or equal to 10% by weight in the cloth.

It should be appreciated that in the case where printing is performed only with ink corresponding to the fiber having large blending rate depending upon the blending ratio, sufficient coloring may be obtained without causing lowering of density of the image by employing ink of higher dye concentration or by increasing ejecting amount of the ink.

As set forth above, in the case where ejection of the inks of the same color and different composition is performed through respective upper and lower ink-jet heads 13' and 13, the SMS generator 522 passes the data through and does not perform distribution of the image data for the upper and lower heads. Namely, the upper and lower heads ejecting the inks of the same color and different compositions performs ejecting of the inks for printing the identical image.

Considering the case of printing on the blended fiber cloth of cotton and polyester, the ink containing reactive dye for cotton is employed for the upper ink supply system and the ink containing disperse dye for polyester is employed for the lower ink supply system. By this, cotton forming the blended cloth is effectively dyed by the reactive dye ejected by the upper head and polyester is effectively dyed by the disperse dye ejected by the lower head.

As set forth, the upper ink-jet head 13' and the lower ink-jet head 13' eject inks of the same color and different compositions. In the shown embodiment, on the portion of the cloth where the ejected ink from the lower head 13 is propagated, the ejected ink from the upper head 13' is propagated in overlaying manner so that respective dyes may color the corresponding fibers effectively depending upon the dyeing properties. For instance, in the case of the example set forth above, the ink ejected from the lower head 13 effectively colors the polyester fiber and the ink ejected from the upper head 13' effectively colors the cotton fiber. In such case, as long as no problem in color development is arisen with elaboration in preparation for the cloth, inks may be ejected in any order.

However, in general, in case of 1) ink containing reactive dye, 2) ink containing acid dye, direct dye or basic dye, 3) ink containing disperse dye, ejecting the inks in order of 1), 2), 3) is preferred in view of uniformity of coloring and stability of color development.

The inks of 1) to 3) set forth above are differentiated in dyeing mechanism. Namely, the disperse dye forming the ink of 3) dyes the fiber in a manner that the disperse dye diffuses in the specific fiber and is physically joined to the fiber, precedingly adhering ink may have little influence for dyeing. Therefore, the ink of 3) may cause little problem in coloring even when it is ejected after dyeing by the ink of 1) or 2).

On the other hand, inks of 1) and 2) color the specific fibers by covalent bonding and ion bonding, it can be influenced in dyeing property by the precedingly adhering ink. Therefore, it is desirable to eject the ink of 1) and 2) in advance.

Furthermore, the order of ejection of the inks of 1) and 2) will not cause significant problem. However, it is desirable to eject the ink of 1) which dyes by covalent bonding at earlier timing for improving uniformity of dyeing and stability of coloring.

(Second Embodiment)

Figure 10:
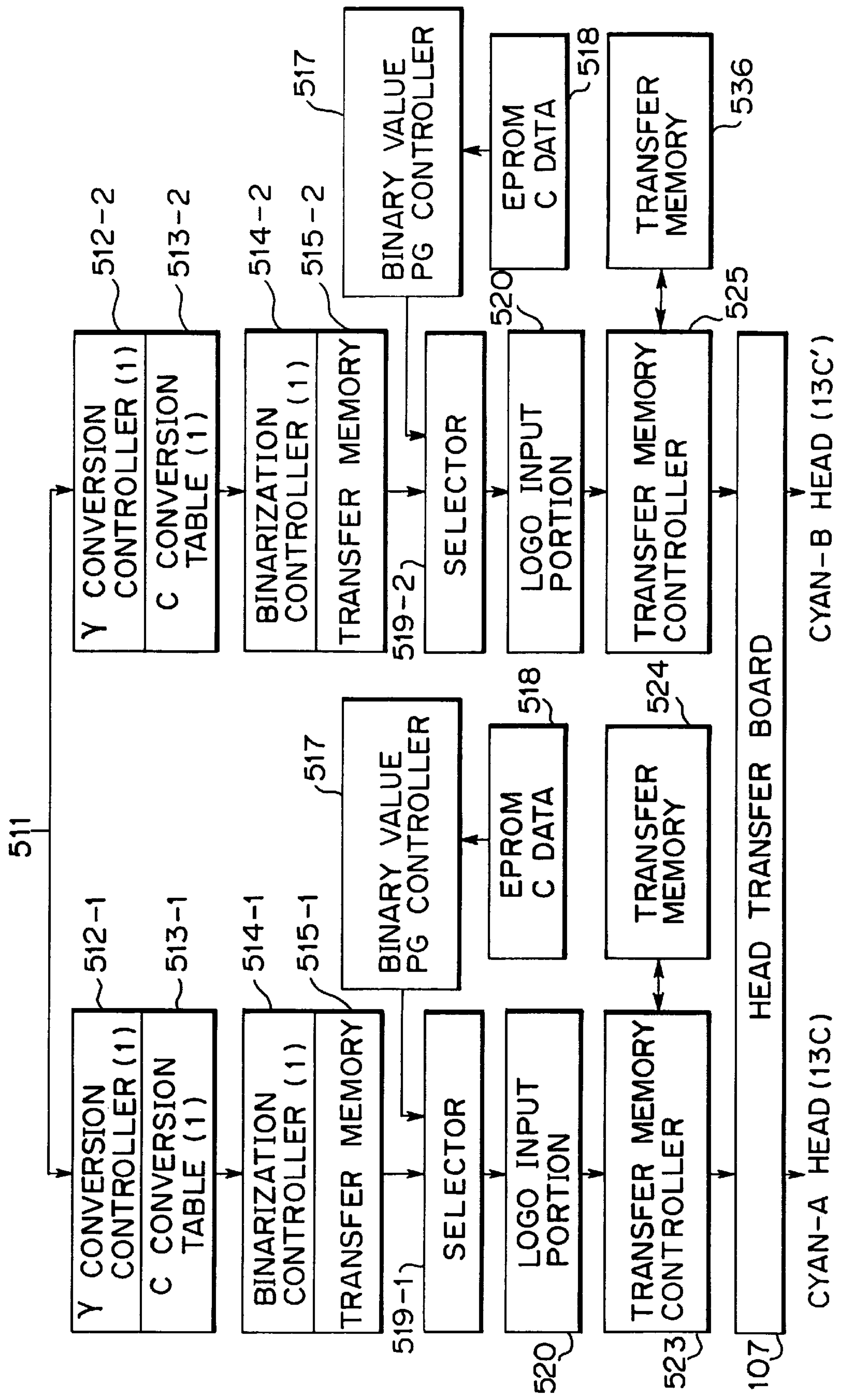
FIG. 10 is a block diagram of another embodiment of the invention.

FIG. 10 shows another embodiment of the present invention, in which is illustrated a construction image processing system incorporating means for switching density to be printed by each of the upper and lower heads. It should be appreciated that while FIG. 10 illustrates a system corresponding to cyan color, the same construction is, of course, applicable for each color.

In the shown embodiment, the construction subsequent to the HS conversion table 511 shown in FIG. 6 in the former embodiment, is provided as two systems (which are illustrated with reference numerals common to FIG. 6 but with extensions of "−1" and "2"), as shown in FIG. 10. The density of coloring (ink amount) by the upper head is controlled by gamma-conversion table 513-1, and the density of coloring (ink amount) by the lower head is controlled by gamma-conversion table 513-2. Then, necessary processes are performed subsequently.

With such construction, modification of coloring ratio by the reactive dye and disperse dye depending upon blending ratio of two kinds of fibers having different dyeing properties in the blended fiber cloth, can be realized. Also, correction in the case where the reactive dye and disperse dye are different in density while the ejection amounts are the same, can be realized.

In such case, in general, the proportion of dyes by weight depending upon the blending ratio of fibers of the cloth is preferably set to be slightly lower than the fiber blending ratio in the disperse dye and to be slightly high than the fiber blending ratio in the reactive dye.

This is because that when printing is performed with the same weight ratios of disperse dye and reactive dye, the reactive dye has tendency to be difficult to dye in comparison with the disperse dye. This tendency is caused by the dyeing mechanism and the difference in a molar absorptivity between above-stated two kinds of dyes. Therefore, it is desirable to provide the reactive dye in slightly greater amount. On the other hand, in the case of the disperse dye, since it dyes the fiber by penetrating in the fiber by its molecular structure, it becomes possible to have lower dye ratio relative to the fiber blending ratio.

While heads are arranged on upper and lower two stages of carriage for each color and thus arrange two heads for each color at different positions in the cloth feeding direction for ejecting inks having different compositions in each embodiment set forth above, the arrangement of heads is not necessarily the different positions in the cloth feeding direction but can be arranged on the common carriage. Also, number of stages of the carriage is not specified to be two, but can be one or three or more. Furthermore, the blended fiber cloth is not necessarily fabricated by two fibers having different dyeing properties but can be fabricated with three or more kinds of fibers. Therefore, the apparatus may have three or more kinds of inks for each color.

Subsequently, the description will be made of the entire processes of the ink jet textile printing. After the ink jet textile printing process is executed by the use of the above-mentioned ink jet printing apparatus, the textile is dried (including natural drying). Then, in continuation, the dyestuff on textile fabric is dispersed, and a process is executed to cause the dyestuff to be reactively fixed to the fabric. With this process, it is possible for the printed textile to obtain a sufficient coloring capability and strength because of the dyestuff fixation.

For this dispersion and reactive fixation processes, the conventionally known method can be employed. A steaming method is named, for example. Here, in this case, it may be possible to give an alkali treatment to the textile in advance before the textile printing.

Then, in the post-treatment process, the removal of the non-reactive dyestuff and that of the substances used in the preparatory process are executed. Lastly, the defect correction, ironing finish, and other adjustment and finish processes are conducted to complete the textile printing.

Particularly, the following performatory characteristics are required for the textile suitable for the ink jet textile printing:

(1) Colors should come out on ink in a sufficient density.

(2) Dye fixation factor is high for ink.

(3) Ink must be dried quickly.

(4) The generation of irregular ink spread is limited.

(5) Feeding can be conducted in an excellent condition in an apparatus.

In order to satisfy these requirements, it may be possible to give a preparatory treatment to the textile used for printing as required. In this respect, the textile having an ink receiving layer is disclosed in Japanese Patent Application Laying-open No. 62-53492, for example. Also, in Japanese Patent Application Publication No. 3-46589, there are proposed the textile which contains reduction preventive agents or alkaline substances. As an example of such preparatory treatment as this, it is also possible to name a process to allow the textile to contain a substance selected from an alkaline substance, water soluble polymer, synthetic polymer, water soluble metallic salt, or urea and thiourea.

As an alkaline substance, there can be named, for example, hydroxide alkali metals such as sodium hydroxide, potassium hydroxide; mono-, di-, and tori-ethanol amine, and other amines; and carbonate or hydrogen carbonate alkali metallic salt such as sodium carbonate, potassium carbonate, and sodium hydrogen carbonate. Furthermore, there are organic acid metallic salt such as calcium carbonate, barium carbonate or ammonia and ammonia compounds. Also, there can be used the sodium trichloroacetic acid and the like which become an alkaline substance by steaming and hot air treatment. For the alkaline substance which is particularly suitable for the purpose, there are the sodium carbonate and sodium hydrogen carbonate which are used for dye coloring of the reactive dyestuffs.

As a water soluble polymer, there can be named starchy substances such as corn and wheat; cellulose substances such as carboxyl methyl cellulose, methyl cellulose, hydroxy ethel cellulose; polysaccharide such as sodium alginic acid, gum arabic, locasweet bean gum, tragacanth gum, guar gum, and tamarind seed; protein substances such as gelatin and casein; and natural water soluble polymer such as tannin and lignin.

Also, as a synthetic polymer, there can be named, for example, polyvinyl alcoholic compounds, polyethylene oxide compounds, acrylic acid water soluble polymer, maleic anhydride water soluble polymer, and the like. Among them, polysaccharide polymer and cellulose polymer should be preferable.

As a water soluble metallic salt, there can be named the pH4 to 10 compounds which produce typical ionic crystals, namely, halogenoid compounds of alkaline metals or alkaline earth metals, for example. As a typical example of these compounds, NaCl, $Na_2SO_4$, KCl and $CH_3$ COONa and the like can be named for the alkaline metals, for example. Also, $CaCl_2$, $MgCl_2$, and the like can be named for the alkaline earth metals. Particularly, salt such as Na, K and Ca should be preferable.

In the preparatory process, a method is not necessarily confined in order to enable the above-mentioned substances and others to be contained in the textile. Usually, however, a dipping method, padding method, coating method, spraying method, and others can be used.

Moreover, since the printing ink used for the ink jet textile printing merely remains to adhere to the textile when printed, it is preferable to perform a subsequent reactive fixation process (dye fixation process) for the dyestuff to be fixed on the textile. A reactive fixation process such as this can be a method publicly known in the art. There can be named steaming method, HT steaming method, and thermofixing method, for example. Also, alkaline pad steaming method, alkaline blotch steaming method, alkaline shock method, alkaline cold fixing method, and the like can be named when a textile is used without any alkaline treatment given in advance.

Further, the removal of the non-reactive dyestuff and the substances used in the preparatory process can be conducted by a rinsing method which is publicly known subsequent to the above-mentioned reactive fixation process. In this respect, it is preferable to conduct a conventional fixing treatment together when this rinsing is conducted.

In this respect, the printed textile is cut in desired sizes after the execution of the above-mentioned post process. Then, to the cut off pieces, the final process such as stitching, adhesion, and deposition is executed for the provision of the finished products. Hence, one-pieces, dresses, neckties, swimsuits, aprons, scarves, and the like, and bed covers, sofa covers, handkerchiefs, curtains, book covers, room shoes, tapestries, table cloths, and the like are obtained. The methods of machine stitching the textile to make clothes and other daily needs are disclosed widely in publicly known publications such as "Modern Knitting and Sewing Manual" published by the Textile Journal Inc. or a monthly magazine "Souen" published by Bunka Shuppan Kyoku, and others.

As described above, according to the present invention, it is possible to obtain a high cleaning effect of the liquid discharging surface of the liquid discharging head as well as a long-time stability of the liquid discharging.

Thus, it is possible to produce the effect that the stable recovery can be executed even in a case where a highly viscous liquid is used or highly densified nozzles are employed, or further, an industrial use is required for a long time under severe conditions.

The present invention produces an excellent effect on an ink jet printing head and printing apparatus, particularly on those employing a method for utilizing thermal energy to form flying ink droplets for the printing.

Regarding the typical structure and operational principle of such a method, it is preferable to adopt those which can be implemented using the fundamental principle disclosed in the specifications of U.S. Pat. Nos. 4,723,129 and 4,740,796. This method is applicable to the so-called on-demand type printing system and a continuous type printing system. Particularly, however, it is suitable of the on-demand type because the principle is such that at least one driving signal, which provides a rapid temperature rise beyond a departure from nucleation boiling point in response to printing information, is applied to an electrothermal transducer disposed on a liquid (ink) retaining sheet or liquid passage whereby to cause the electrothermal transducer to generate thermal energy to produce film boiling on the thermoactive portion of the printing head; thus effectively leading to the resultant formation of a bubble in the printing liquid (ink) one to one for reach of the driving signals. By the development and contraction of the bubble, the liquid (ink) is discharged through a discharging port to produce at least one droplet. The driving signal is preferably in the form of pulses because the development and contraction of the bubble can be effectuated instantaneously, and, therefore, the liquid (ink) is discharged with quicker responses.

The driving signal in the form of pulses is preferably such as disclosed in the specifications of U.S. Pat. Nos. 4,463,359 and 4,345,262. In this respect, if the conditions disclosed in the specification of U.S. Pat. No. 4,313,124 regarding the rate of temperature increase of the heating surface preferably are adopted, it is possible to perform an excellent printing in a better condition.

The structure of the printing head may be as shown in each of the above-mentioned specifications wherein the structure is arranged to combine the discharging ports, liquid passages, and electrothermal transducers as disclosed in the above-mentioned patents (linear type liquid passage or right angle liquid passage). Besides, it may be possible to form a structure such as disclosed in the specifications of U.S. Pat. Nos. 4,558,333 and 4,459,600 wherein the thermally activated portions are arranged in a curved area.

Furthermore, as a full line type printing head having a length corresponding to the maximum printing width, the present invention demonstrates the above-mentioned effect more efficiently with a structure arranged either by combining plural printing heads disclosed in the above-mentioned specifications or by a single printing head integrally constructed to cover such a length.

In addition, the present invention is effectively applicable to a replaceable chip type printing head which is connected electrically with the main apparatus and can be supplied with ink when it is mounted in the main assembly, or to a cartridge type printing head having an integral ink container.

Furthermore, as a printing mode for the printing apparatus, it is not only possible to arrange a monochromatic mode mainly with black, but also it may be possible to arrange an apparatus having at least one of multi-color mode with different color ink materials and/or a full-color mode using the mixture of the colors irrespective of the printing heads which are integrally formed as one unit or as a combination of plural printing heads. The present invention is extremely effective for such an apparatus as this.

Now, in the embodiments according to the present invention set forth above, while the ink has been described as liquid, it may be an ink material which is solidified below the room temperature but liquefied at the room temperature or may be liquid. Since the ink is controlled within the temperature not lower than 30° C. and not higher than 70° C. to stabilize its viscosity for the provision of the stable discharge in general, the ink may be such that it can be liquefied when the applicable printing signals are given.

In addition, while preventing the temperature rise due to the thermal energy by the positive use of such energy as an energy consumed for changing states of the ink from solid to liquid, or using the ink which will be solidified when left intact for the purpose of preventing ink evaporation, it may be possible to apply to the present invention the use of an ink having a nature of being liquefied only by the application of thermal energy such as an ink capable of being discharged as ink liquid by enabling itself to be liquefied anyway when the thermal energy is given in accordance with printing signals, an ink which will have already begun solidifying itself by the time it reaches a printing medium.

In addition, as modes of a printing apparatus according to the present invention, there are a copying apparatus combined with reader and the like, and those adopting a mode as a facsimile apparatus having transmitting and receiving functions, besides those used as an image output terminal structured integrally or individually for an information processing apparatus such as a word processor and a computer.

The present invention has been described in detail with respect to preferred embodiments, and it will now be that changes and modifications may be made without departing from the invention in its broader aspects, and it is the intention, therefore, in the appended claims to cover all such changes and modifications as fall within the true spirit of the invention.

What is claimed is:

1. An ink-jet printed product producing apparatus employing a plurality of ink-jet heads, which are provided corresponding to a plurality of inks differing in dyeing characteristics and having a same tone and different compositions, for ejecting the plurality of inks of the same tone and different compositions, and performing printing by ejecting inks from said plurality of ink-jet heads to a printing medium, said apparatus comprising:

means for providing each of said plurality of ink-jet heads for use at different printing steps for printing on said printing medium, respectively;

transfer means for transferring ejection data to each of said plurality of ink-jet heads, correspondingly; and head driving means for driving each of said plurality of ink-jet heads to eject the inks of the same tone and different compositions on a basis of the ejection data.

2. A producing apparatus as claimed in claim 1, wherein said plurality of ink-jet heads performs ejection in printing based on same ejection data.

3. A producing apparatus as claimed in claim 2, wherein the different compositions of inks are differentiated by differentiating dyes contained in respective inks, said printing medium contains a plurality of kinds of mutually distinct fibers having different dyeing properties, and said plurality of ink-jet heads are provided corresponding to said plurality of kinds of fibers.

4. A producing apparatus as claimed in claim 3, wherein said plurality of ink jet heads are arranged in a feeding direction of the printing medium.

5. A producing apparatus as claimed in claim 4, wherein between printing steps of respective of said plurality of ink-jet heads, fixing means for fixing dye on the printing medium is provided.

6. A producing apparatus as claimed in claim 3, further comprising control means for varying an ejection ratio of inks to the printing medium through said ink-jet heads depending upon a ratio of content of said plurality of fibers, wherein the ejection ratio is a ratio of an ejection amount of respective inks and the content ratio is a ratio of amounts of the plurality of kinds of fibers in the printing medium.

7. A producing apparatus as claimed in claim 6, wherein said control means sets the ejection ratio of the ink-jet head corresponding to a fiber having the ratio of content less than or equal to a predetermined value.

8. A producing apparatus as claimed in claim 7, wherein said control means increases the ejection ratio of the ink-jet head corresponding to a fiber having ratio of content greater than or equal to a predetermined value.

9. A producing apparatus as claimed in claim 8, wherein the printing steps by said plurality of ink-jet heads are ordered depending upon the dyes of the inks to be ejected through the ink-jet heads.

10. A producing apparatus as claimed in claim 9, wherein said plurality of ink-jet heads respectively eject ink containing disperse dye and ink containing reactive dye, and said control means sets the ejection ratio of the ink containing disperse ink to be slightly lower relative to the ratio of content of the corresponding fiber and sets the ejection ratio of the ink containing reactive dye to be slightly higher relative to ratio of the content of the corresponding fiber.

11. An ink-jet printed product producing apparatus employing a plurality of ink-jet heads ejecting inks of a same tone and different compositions and performing printing by ejecting inks from said plurality of ink-jet heads to a printing medium containing a plurality of kinds of fibers, said apparatus comprising:

transfer means for transferring ejection data to each of said plurality of ink-let heads, correspondingly;

head driving means for driving each of said plurality of ink-jet heads to elect the inks of the same tone and different compositions on a basis of the ejection data; and control means for varying an ejection ratio of the inks ejected to the printing medium through said plurality of ink-jet heads depending upon a ratio of content of said plurality of fibers, wherein the ejection ratio is a ratio of an ejection amount of respective inks and the content ratio is a ratio of amounts of the plurality of kinds of fibers in the printing medium.

12. A producing apparatus as claimed in claim 1, further comprising means for determining an order of ejection of said plurality of ink-jet heads in printing depending upon a difference of the dyeing characteristics of each of said inks.

13. A producing apparatus as claimed in claim 1, further comprising print control means for controlling inks ejected from said plurality of ink-jet heads to land on a substantially same position on said printing medium.

14. A producing apparatus as claimed in claim 1, further comprising:

feeding means for feeding the printing medium;

scanning means for arranging said plurality of ink-jet heads in a feeding direction of the printing medium fed by said feeding means and for scanning said plurality of ink-jet heads in a direction different from the feeding direction; and control means for controlling feeding of said feeding means and scanning by said scanning means for overlaying a printing region by respective heads of said plurality of ink-jet heads.

15. A producing apparatus as claimed in claim 1, wherein each respective head of said plurality of ink-jet heads generates a bubble in ink utilizing thermal energy and ejects the ink in response to generation of said bubble.

16. A producing method of an ink-jet printed product for performing printing by ejecting ink onto a printing medium, said method comprising the steps of:

providing a plurality of ink-jet heads, which correspond to a plurality of inks differing in dyeing characteristics and having a same tone and different compositions, for ejecting the plurality of inks of the same tone and different compositions;

transferring ejection data to each of said plurality of ink-jet heads, correspondingly;

driving each of said plurality of ink-jet heads to eject the inks of the same tone and different compositions based on the ejection data; and performing printing steps employing respective heads of said plurality of ink-jet heads with a given interval between said printing steps.

17. A printed product printed by the method as claimed in claim 16.

18. A processed product obtained by further processing the printed product as claimed in claim 17.

19. A processed product as claimed in claim 18, wherein said processed product is obtained in a manner that said printed product is cut into a cut piece of a desired size and the cut piece is further processed in a process for obtaining a final processed product.

20. A processed product as claimed in claim 19, wherein said process for obtaining the final processed product is sewing.

21. A processed product as claimed in claim 20, wherein said processed product comprises clothes.

22. A producing method as claimed in claim 16, wherein each respective head of said plurality of ink-jet heads generates a bubble in ink utilizing thermal energy and ejects the ink in response to generation of said bubble.

23. A producing apparatus as claimed in claim 3, further comprising control means for varying a print density depending upon a ratio of content of said plurality of fibers.

24. A producing apparatus as claimed in claim 23, wherein said control means varies the print density by means of image processing.

* * * * *

CERTIFICATE OF CORRECTION

PATENT NO. : 5,854,642
DATED : December 29, 1998
INVENTOR(S) : TAKAHASHI ET AL.

It is certified that error appears in the above-indentified patent and that said Letters Patent is hereby corrected as shown below:

On the title page, item:

[56] References Cited:

FOREIGN PATENT DOCUMENTS,

"3046589" should read --3-046589--.

"5330083" should read --5-330083--.

"6091998" should read --6-091998--.

COLUMN 1:

Line 39, "to increasing of" should read --increasing the--.

COLUMN 2:

Line 43, "to respective of" should read --for--.

Line 45, "can" should read --can be--.

Line 47, "repeated" should read --repeat--.

CERTIFICATE OF CORRECTION

PATENT NO. : 5,854,642

DATED : December 29, 1998

INVENTOR(S) : TAKAHASHI ET AL.

It is certified that error appears in the above-indentified patent and that said Letters Patent is hereby corrected as shown below:

COLUMN 5:

Line 48, "ventilated," should read --ventilated--.

COLUMN 6:

Line 8, "subject" should read --subjected to--.

Line 42, "direction," should read --direction--.

COLUMN 8:

Line 1, "and" should be deleted.

COLUMN 9:

Line 25, "color," should read --color.--.

COLUMN 10:

Line 19, "speed," should read --speed--.

Line 25, "heads." should read --head.--.

Line 37, "represent" should read --represents--.

CERTIFICATE OF CORRECTION

PATENT NO. : 5,854,642

DATED : December 29, 1998

INVENTOR(S) : TAKAHASHI ET AL.

It is certified that error appears in the above-indentified patent and that said Letters Patent is hereby corrected as shown below:

COLUMN 11:

Line 41, "blending." should read --blending is used.--.

COLUMN 13:

Line 31, "processes" should read --process--.

COLUMN 15:

Line 30, "of" should read --for--.

Line 38, "head;" should read --head,--.

COLUMN 16:

Line 67, "data" should read --data, wherein the inks of the same tone and different compositions contain different dyes which differ from each other with regard to suitability in dyeing fibers forming the printing medium.--.

CERTIFICATE OF CORRECTION

PATENT NO. : 5,854,642

DATED : December 29, 1998

INVENTOR(S) : TAKAHASHI ET AL.

It is certified that error appears in the above-indentified patent and that said Letters Patent is hereby corrected as shown below:

COLUMN 17:

Line 14, "steps of respective" should read --locations of respective heads--.

Line 42, "to ratio of the" should read --to the ratio of--.

COLUMN 18:

Lines 24-40 should be replaced with the following:

--16. A producing method of an ink-jet printed product for performing printing by ejecting ink onto a printing medium, said method comprising the steps of:

providing a plurality of ink-jet heads, which correspond to a plurality of inks differing in dyeing characteristics, for ejecting the plurality of inks;

transferring ejection data to each of said plurality of ink-jet heads, correspondingly;

CERTIFICATE OF CORRECTION

PATENT NO. : 5,854,642 
DATED : December 29, 1998
INVENTOR(S) : TAKAHASHI ET AL.

It is certified that error appears in the above-indentified patent and that said Letters Patent is hereby corrected as shown below:

driving in a first ejection step one of said plurality of ink-jet heads to eject a corresponding ink based on corresponding ejection data; and driving in a second ejection step another of said plurality of ink-jet heads to eject a corresponding ink based on corresponding ejection data, wherein the ink ejected in said first ejection step and the ink ejected in said second ejection step have the same tone and different compositions, and contain different dyes which differ from each other with regard to suitability in dyeing fibers forming the printing medium.--.

Signed and Sealed this

Fifth Day of October, 1999

Attest:

Q. TODD DICKINSON

Attesting Officer

*Acting Commissioner of Patents and Trademarks*